United States Patent [19]

Ralph et al.

[11] Patent Number: 4,917,334
[45] Date of Patent: Apr. 17, 1990

[54] MULTIWHEELED TRAILING TYPE LANDING GEAR ASSEMBLY

[75] Inventors: Harry C. Ralph, Kirkland; Gerhard E. Seidel, Renton, both of Wash.

[73] Assignee: The Boeing Company, Seattle, Wash.

[21] Appl. No.: 251,428

[22] Filed: Sep. 30, 1988

[51] Int. Cl.⁴ ............................................... B64C 25/10
[52] U.S. Cl. ................................................ 244/102 R
[58] Field of Search ........ 244/102 R, 102 A, 102 SL, 244/102 SS, 100 R; 280/678, 81 R

[56] References Cited

U.S. PATENT DOCUMENTS

| | | | |
|---|---|---|---|
| 2,220,546 | 11/1940 | Saulner . | |
| 2,431,302 | 11/1947 | Bachman et al. | 244/104 FP |
| 2,454,658 | 11/1948 | Leitch | 244/102 R |
| 2,487,548 | 11/1949 | Hawkins, Jr. | 280/81 R |
| 2,661,171 | 12/1953 | Allen | 244/102 |
| 2,869,806 | 1/1959 | Beach | 244/102 |
| 2,974,909 | 3/1961 | Perdue | 244/102 |
| 3,017,143 | 1/1962 | Hartel | 244/102 |
| 3,041,020 | 6/1962 | Willitt | 244/102 |
| 3,091,418 | 5/1963 | Pitt | 244/103 |
| 3,171,619 | 3/1965 | Alesbury | 244/102 |
| 3,198,461 | 8/1965 | Beach | 244/102 |
| 4,147,316 | 4/1979 | Kendall | 244/102 |
| 4,199,119 | 4/1980 | Masclet | 244/104 FP |
| 4,412,665 | 11/1983 | Kramer et al. | 244/102 |

FOREIGN PATENT DOCUMENTS

| | | | |
|---|---|---|---|
| 1390909 | 1/1965 | France | 244/102 R |
| 1442334 | 5/1966 | France | 244/102 R |
| 1513398 | 1/1968 | France | 244/102 R |
| 877505 | 9/1961 | United Kingdom | 244/102 R |
| 2101542 | 1/1983 | United Kingdom | 244/102 SL |

Primary Examiner—Joseph F. Peters, Jr.
Assistant Examiner—Anne Sartelle
Attorney, Agent, or Firm—Robert H. Sproule; B. A. Donahue

[57] ABSTRACT

A multiwheel landing gear assembly includes a forward set of wheels which are in tandem with a middle set of wheels which in turn are in tandem with a rear set of wheels. The forward set of wheels are connected to a main support strut of the landing gear by a levered arrangement. The middle and rear set of wheels are connected together by a truck beam which in turn is connected to the main support strut by a radius rod. When the middle and rear wheels are subject to an upward force such as when the aircraft is landing, the radius rod limits movement of the wheels in a generally upward direction along a path having a radius which is equal to the length of the radius rod. Movement of the middle and rear wheels along the path in the upward direction is resisted by a shock absorber. In this manner, the vertical loads are reacted in a lengthwise direction along the radius rod and shock absorber.

7 Claims, 3 Drawing Sheets

# MULTIWHEELED TRAILING TYPE LANDING GEAR ASSEMBLY

TECHNICAL FIELD

The present invention relates to an aircraft landing gear assembly, and more particularly to a landing gear assembly having a plurality of wheels which are mounted rearward of a main mounting strut.

BACKGROUND OF THE INVENTION

In some aircraft, it is desirable to attach the landing gear to the aircraft so that the landing gear wheels are as far aft as possible when the gear is in the extended (static) position. This may be required to provide the proper distribution of weight between the aircraft nosewheel and main wheels particularly when the aircraft has an aft center of gravity, or when the wing shape dictates that the landing gear main strut be attached to the aircraft at a more forward location.

In some conventional landing gear assemblies, shock absorbing devices are housed in the main support strut. When extended, the main support strut is in a vertical position so that many of the static and dynamic loads are reacted directly through the shock absorbing device in the strut. Some rearward positioning of the landing gear wheels has been accomplished by inclining the main support strut in a rearward direction. However, when the aircraft is taxiing, the landing gear is subjected to various side loads and drag loads. Unless the rearward inclination angle is kept relatively small, e.g. seven degrees or less, the forces reacting on the landing gear due to these side loads and drag loads can cause structural damage. Moreover, this limited angle of inclination of the landing gear greatly restricts the desired aftward positioning of the landing gear wheels.

A number of landing gear assemblies having a trailing wheel or wheels have been disclosed. For example, U.S. Pat. No. 4,412,665 by Kramer et al discloses a multi-wheeled landing gear assembly in which the wheels are attached to a number of trailing levers.

Furthermore, in U.S. Pat. No. 4,199,119 by Masclet there is disclosed a retractable landing gear assembly having a trailing wheel or wheels.

SUMMARY OF THE INVENTION

The present invention pertains to a landing gear assembly for an aircraft. The landing gear assembly includes a main support member which is connected to the aircraft, and a first wheel assembly for supporting the aircraft on the ground. Also included in the landing gear assembly are (i) means for connecting the first wheel assembly to the main support member, (ii) a second wheel assembly for supporting the aircraft on the ground, and (iii) means for connecting the second wheel assembly to the main support member in a manner that the first and second wheel assemblies are in tandem. The second wheel connecting means includes (1) radius means for permitting movement of the second wheel assembly along a path which is a selected radius from a first location on the main support member, and (2) absorbing means for resisting movement of the second wheel means in a first direction along the path when the second wheel assembly is subjected to a force in the first direction resulting from contact of the second wheel assembly with the ground.

BRIEF DESCRIPTION OF THE DRAWINGS

The present invention will be understood by reading the following detailed description in conjunction with the attached drawings, in which.

DETAILED DESCRIPTION OF THE INVENTION

The present invention pertains to a landing gear assembly having a plurality of wheels which are mounted aft of a main strut which connects the wheels to the aircraft. This provides the aircraft with a landing gear assembly which is connected to the aircraft at a forward location, but which contacts the ground rearward of the location where the landing gear assembly is connected to the aircraft.

Figures 1, 2:
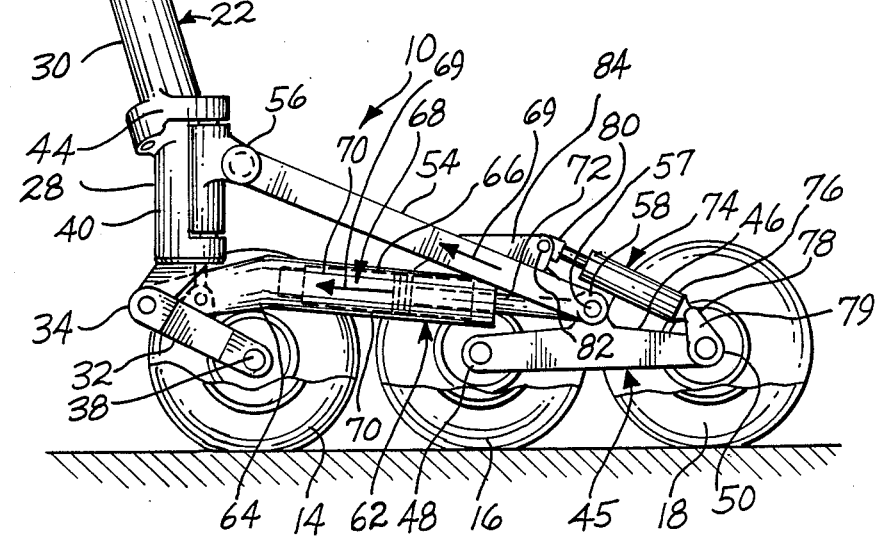
FIG. 1 is a side view of an exemplary landing gear assembly of the present invention in an extended (static) position on the ground.
FIG. 2 is a top view of the exemplary landing gear shown in FIG. 1.

Referring first to FIGS. 1 and 2, there is shown a landing gear assembly generally indicated at 10 having a forward set of side-by-side wheels 14, a middle set of side-by-side wheels 16, and a rear set of side-by-side wheels 18. The gear assembly is connected to an aircraft 20 (shown only partially) by means of a main strut 22. The main strut 22 is connected to the aircraft in a conventional manner at spindles 26 to permit movement of the landing gear assembly between a retracted position (not shown), and an extended position shown in FIG. 1 in which the main strut 22 is generally vertical.

The main strut 22 includes a lower portion 28 having a longitudinal axis which is generally vertical when the landing gear assembly is in the extended position, and an upper portion 30 which is inclined from the spindles 26 in a rearward direction to provide some displacement of the wheels in the rearward direction. In order to attach the forward wheels 14 to the main strut, left, right fore-and-aft extending lever arms 32 are pivotally connected to the lower end of the main strut by a transverse pin joint 34. The other ends of the lever arms 32 are pivotally connected to the ends of a transversely extending axle 38 which supports the left and right forward wheels 14. Movement of the lever arms 32 is limited by a conventional compression shock absorber 40 formed by a piston/cylinder assembly. By the term "compression shock absorber" it is meant that as the piston moves into the cylinder, the resistance to further movement of the piston increases. In this manner the shock absorber 40 supports the dynamic and static loads acting on the forward wheels when the aircraft is on the ground. The shock absorber 40 is located inside the main strut lower portion 28 and is attached in a vertical manner between the main strut and one of the lever arms 32. More specifically, the piston end of the shock absorber 40 is pivotally connected about a transverse axis to a small lug 42 which is attached to one of the lever arms 32. The upper end of the cylinder is pivotally connected about a transverse axis to the main strut 22 at a juncture 44 where the upper and lower portions of the main strut meet.

In order to interconnect the middle wheels 16 and the rear wheels 18 to form a truck assembly indicated at 45 (FIGS. 1 and 2), there is provided a pair of parallel fore-and-aft extending truck beams 46 each having a forward end which supports an end of a transversely extending axle 48 and a rear end which supports an end of a transversely extending axle 50. Attached to opposite ends of the axle 48 at either side of the truck beam are the middle wheels 16, and attached to opposite ends of the rear axle 50 are the rear wheels 18. The truck beams 46 are connected to the main strut 22 by respective radius rods 54 each having a forward end which is pivotally connected to the lower portion of the main strut by a transverse pin connector 56. Each radius rod 54 extends in a fore and aft direction and has a rear end which is attached by a pivot connector 57 to a small upwardly extending lug 58 which is integral to the middle of each truck beam 46.

In order to limit the movement of middle and rear wheels when subjected to vertical loads, a fore and aft extending tension maintaining member 62 is connected between the main strut 22 and the truck assembly 45. More particularly, the tension maintaining member 62 includes a forward portion 64 which has its forward end connected to the pin joint 34. As shown in FIG. 1, the forward portion extends rearward and slightly upward to allow for some upward movement of the forward axle 38 when the forward wheels are subjected to vertical loads. A rear portion 66 of the tension maintaining member 62 extends downward and rearward from the forward portion and includes a conventional tension shock absorber indicated at 68. The tension shock absorber 68 is formed by a piston/cylinder assembly in which a cylinder 70 is fixedly mounted inside the rear portion 66 of the tension member, and a rear end of a piston 72 is pivotally attached to the pin connector 58. By the term "tension shock absorber" it is meant that as the piston extends further outward from the cylinder, the resistance to further outward movement of the piston increases.

Figure 3:
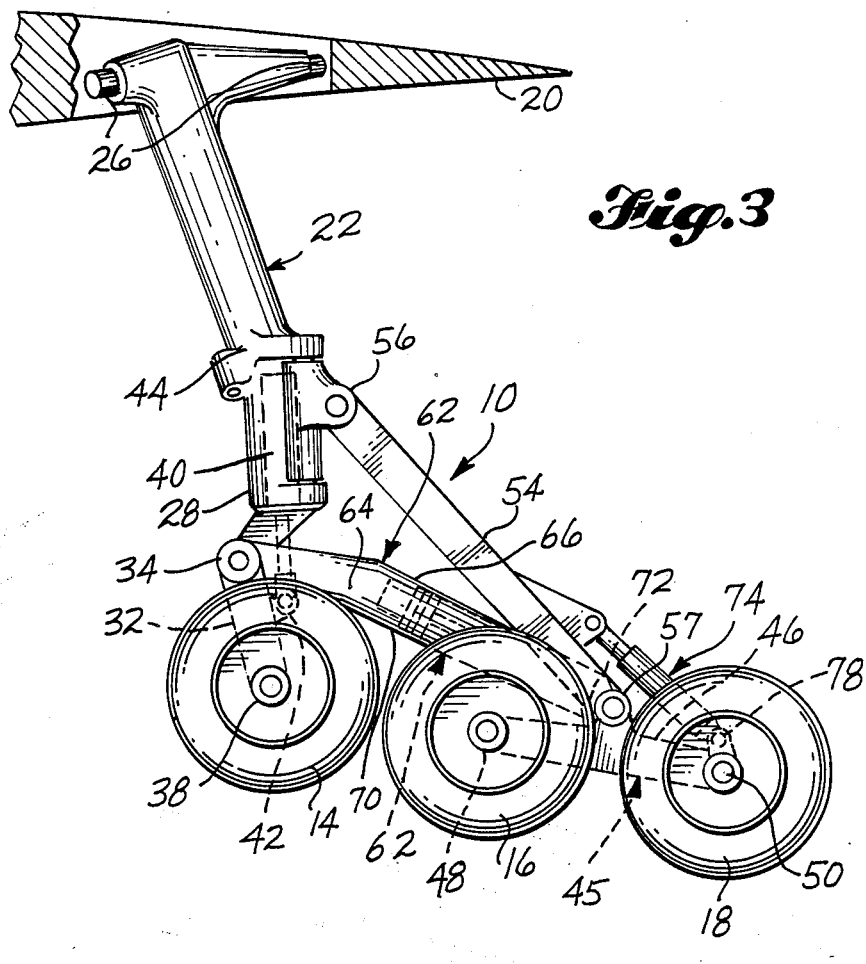
FIG. 3 is a side view of the exemplary landing gear in an extended position in the air.

It should be appreciated that in the present invention the vertical loads on the landing gear assembly are reacted in a generally horizontal direction through the radius rod 54 and the tension shock absorber 68. For example, as shown in FIG. 3, when the aircraft is airborne during a landing approach, the piston 72 of the tension shock absorber 68 is retracted inside the cylinder 70 (shock absorber gases at minimum pressure) due to the weight of the wheels and associated components. This places the landing gear in a position whereby the middle wheels 16 are located downward and rearward from the forward wheels 14, and the rear wheels 18 are located downward and rearward from the middle wheels 16. When the middle and rear wheels contact the runway (FIG. 1), the radius rods 54 pivot upward about the pin connector 56 and the tension maintaining member 62 pivots upward about the pin connector 34. The accurate upward path of the truck assembly 45 is established by the radius rod 54, while the amount of upward movement along this path is limited by the tension shock absorber 68. In this invention the vertical loads acting on the truck assembly 45 are reacted longitudinally along the radius rod 54 and the tension member 62 as shown by the arrows designated by the number 69 (FIG. 1). In this manner there is no bending of the elements 54, 62 except for small frictional moments at each pivot pin 34, 56, and 57.

Figure 4:
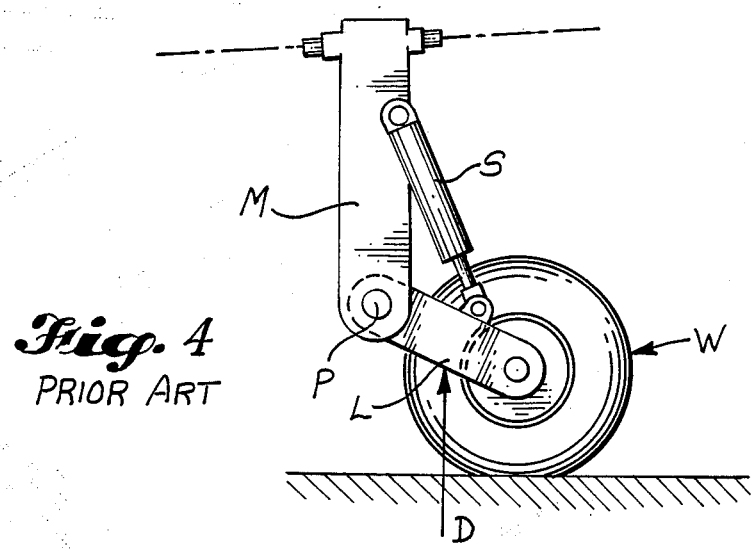
FIG. 4 is a side view of a conventional levered landing gear.

In conventional levered landing gear assemblies such as the one shown in FIG. 4, vertical loads are reacted across the lever. More specifically, a landing wheel W is attached to a lever L which is pivotally connected to the lower end of a main strut M at a pivot point P. The movement of lever L about the point P is limited by a compression shock absorber S. In this conventional landing gear, the lever L is required to be stronger (adding more weight to the assembly) since the vertical loads are reacting across the lever L as indicated by the arrow designated by the letter D. These loads tend to cause bending of the lever L.

In the present invention a compression shock absorber 74 (FIG. 1) is connected between the radius rods 54 and the rear axle 50. More particularly, the shock absorber 74 includes a cylinder 76 which is attached by a pivot connector 78 to an upwardly extending lug 79 which in turn is attached to the rear axle 50. A piston 80 has its forward end attached by a transverse pivot pin 82 to respective lugs 84 which extend upwardly from each radius rod 54. The piston is fully extended during landing approach, so that the truck assembly is positioned as shown in FIG. 3. However upon touchdown with the runway, counterclockwise rotation of the truck assembly about the pivot connector 57 is resisted by the compression shock absorber 74.

Figure 5:
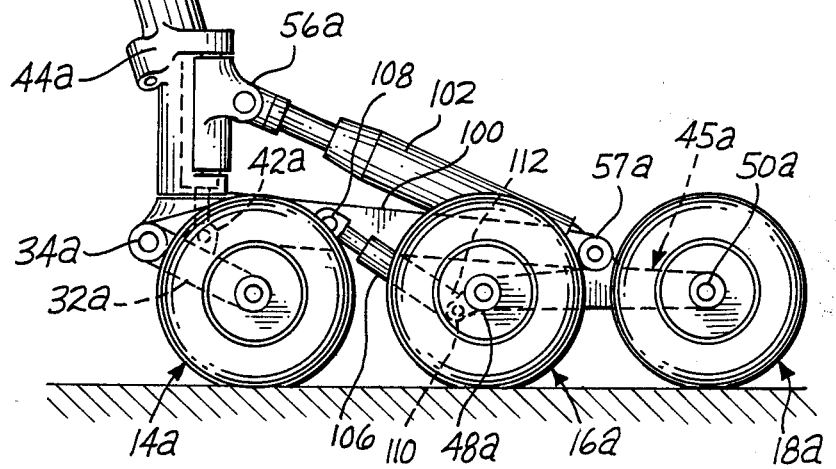
FIG. 5 is a side view of another exemplary landing gear assembly of the present invention.

Another exemplary landing gear assembly is shown in FIG. 5 where like elements described in the previous embodiment are designated by like numerals with the suffix "a" attached. In the present embodiment, the tension member 62 in the previous embodiment is replaced by a radius rod 100 which is a one piece structural element having a forward end attached to the pivot connector 34a and a rearward end attached to the pivot connector 57a. Furthermore, the radius rod 54 in the previous embodiment is replaced by a conventional compression shock absorber 102 formed by a piston/cylinder assembly in which a forward end of the piston is attached to the pivot connector 56a and a rearward end of the cylinder is attached to the pivot connector 57a. In this manner, the path of the truck assembly 45a about the connector 34a is determined by the radius rod 100, while the amount of upward movement of the truck assembly along this arcuate path is controlled by the compression shock absorber 102.

In order to properly position the truck assembly during landing approach and to limit movement of the truck assembly about the pivot connector 57a when subjected to ground load forces, a conventional extension shock absorber 106 is connected between the radius rod 100 and the middle axle 48a. More specifically, the shock absorber 106 includes a piston/cylinder assembly in which a forward end of the piston is connected to a middle portion of the radius rod 100 by a pivot connector 108. A rear end of the cylinder is connected to a lug 110 at a pivot connector 112. The lug in turn extends downward and forward from the middle axle 48a. In this manner during landing approach the piston is fully extended to properly position the truck assembly, and then during landing the vertical load forces are opposed by the compression of the shock absorber.

What is claimed is:
1. A landing gear assembly for an aircraft comprising:
   a. a main support member which is connected to the aircraft;
   b. a first wheel assembly for supporting the aircraft on the ground;

c. means for connecting the first wheel assembly to the main support member;

d. a second wheel assembly for supporting the aircraft on the ground, the second wheel assembly including (1) a middle wheel which is located adjacent to the forward wheel, (2) a rear wheel which is located adjacent to the middle wheel, and (3) truck means for connecting the middle wheel with the rear wheel; and e. means for connecting the second wheel assembly to the main support member in a member that the first and second wheel assemblies are in tandem, the second wheel connecting means including (1) radius means for permitting movement of the second wheel assembly along a path which is a selected radius from a first location on the main support member, and (2) absorbing means for resisting movement of the second wheel means in a first direction along the path when the second wheel assembly is subjected to a force in the first direction resulting from contact of the second wheel assembly with the ground.

2. The apparatus as set forth in claim 1 wherein the radius means includes an elongate member which is pivotally connected to the main support member at the first location and to the second wheel assembly.

3. The apparatus as set forth in claim 2 wherein:

a. the absorbing means includes elongate means which are pivotally connected to the main support member at a second location and to the second wheel assembly;

b. the elongate means has a lengthwise dimension which is changeable when subjected to the upward force; and c. the absorbing means includes means for resisting the change in the lengthwise dimension of the elongate means.

4. The apparatus as set forth in claim 3 wherein:

a. the elongate member is positioned relative to the elongate means so that movement of the second wheel assembly along the path in the first direction causes extension of the elongate means along the lengthwise axis; and b. the elongate means includes means for resisting the extension of the elongate means when the second wheel assembly moves along the path in the first direction.

5. The apparatus as set forth in claim 4 wherein:

a. the elongate member is positioned relative to the elongate means so that movement of the second wheel assembly along the path in the first direction causes compression of the elongate means; and b. the absorbing means includes means for resisting the compression of the elongate means when the second wheel assembly moves along the path in the first direction.

6. The apparatus as set forth in claim 5 wherein the elongate means includes spring means.

7. The apparatus as set forth in claim 6 wherein the spring means includes a piston which is movable inside a cylinder.

* * * * *